US009038723B2

(12) United States Patent  
Trudeau et al.

(10) Patent No.: US 9,038,723 B2  
(45) Date of Patent: May 26, 2015

(54) TUBULAR MEMBER CUTTING TOOL

(75) Inventors: Leon Bernard Trudeau, Lac Du Bonnet (CA); Ronald Denis Denniel, Winnepeg (CA)

(73) Assignee: Leon Bernard Trudeau, Manitoba (CA)

( * ) Notice: Subject to any disclaimer, the term of this patent is extended or adjusted under 35 U.S.C. 154(b) by 406 days.

(21) Appl. No.: 13/416,988

(22) Filed: Mar. 9, 2012

(65) Prior Publication Data

US 2013/0233139 A1    Sep. 12, 2013

(51) Int. Cl.
| | |
|---|---|
| B23D 21/14 | (2006.01) |
| B26D 1/09 | (2006.01) |
| B26D 3/16 | (2006.01) |
| E21B 29/00 | (2006.01) |
| B26D 1/00 | (2006.01) |

(52) U.S. Cl.  
CPC ........ B23D 21/14 (2013.01); B26D 1/09 (2013.01); B26D 3/163 (2013.01); B26D 2001/0033 (2013.01); E21B 29/005 (2013.01)

(58) Field of Classification Search  
CPC ......... E21B 29/00; E21B 20/005; F01B 7/20; B26D 2001/0033; B26D 1/09; B26D 3/163; B23D 21/14; B23D 21/00

USPC ........ 166/55.6, 55.8, 297, 298, 376; 175/428, 175/295, 344, 406, 426, 266, 267, 286; 407/2, 116; 408/144

See application file for complete search history.

(56) References Cited

U.S. PATENT DOCUMENTS

| | | | |
|---|---|---|---|
| 2012/0186817 A1* | 7/2012 | Gibson et al. | 166/298 |
| 2012/0186823 A1* | 7/2012 | Xu | 166/373 |

* cited by examiner

Primary Examiner — Yong-Suk (Philip) Ro  
(74) Attorney, Agent, or Firm — Fitch, Even, Tabin & Flannery, LLP (57) ABSTRACT

A cutting tool for cutting pipe or the like from the inside out includes a housing assembly. A first blade actuating wedge assembly is inside the housing assembly and is movable along a longitudinal axis. The first blade actuating wedge assembly has multiple first tapered blade actuating wedges. Each cutting blade is supported in a manner such that a position of the cutting blade relative to the housing assembly along the longitudinal axis is substantially fixed. Each cutting blade is coupled to a respective one of the first tapered blade actuating wedges such that movement of the first tapered blade actuating wedge assembly along the longitudinal axis causes each cutting blade in the first plurality of cutting blades to move perpendicular to the longitudinal axis.

21 Claims, 8 Drawing Sheets

FIG. 1Aiii

TUBULAR MEMBER CUTTING TOOL

FIELD OF THE INVENTION

This application relates to a cutting tool and, more particularly, relates to a cutting tool particularly configured to through cut a tubular member, such as a pipe or pipe-shaped structural member on an oil platform or the like.

BACKGROUND

A pipe cutter is a type of tool that can be used to cut pipe or other annular components (e.g., tubes or the like).

Some types of pipe cutters include plastic tubing cutters, and pipe cutters with a sharp wheel and adjustable jaw grips that can be used by rotating it around the pipe and repeatedly tightening it until it cuts all of the way through the pipe.

Hacksaws also can be used to cut through pipes or the like.

SUMMARY OF THE INVENTION

In one aspect, a cutting tool is disclosed for cutting tubular member, such as a pipe or the like from the inside out.

In a typical implementation, the cutting tool includes a housing assembly. A first blade actuating wedge assembly is inside the housing assembly and is movable along a longitudinal axis. The first blade actuating wedge assembly has multiple first tapered blade actuating wedges.

Each cutting blade is supported in a manner such that a position of the cutting blade relative to the housing assembly along the longitudinal axis is substantially fixed. Each cutting blade is also coupled to a respective one of the first tapered blade actuating wedges such that movement of the first tapered blade actuating wedge assembly along the longitudinal axis causes each cutting blade in the first plurality of cutting blades to move perpendicular to the longitudinal axis. This perpendicular motion, in a typical implementation, can move the cutting blade through a pipe from the inside of the pipe in a substantially radial, outward direction.

In some implementations, the cutting tool further includes: a second blade actuating wedge assembly inside the housing assembly and movable relative to the housing assembly along the longitudinal axis, the second blade actuating wedge assembly comprising a plurality of second tapered blade actuating wedges; and a second plurality of cutting blades, each cutting blade in the second plurality of cutting blades being supported in a manner such that a position of the cutting blade relative to the housing assembly along the longitudinal axis is substantially fixed.

In such implementations, each cutting blade in the second plurality of cutting blades is coupled a respective one of the second tapered blade actuating wedges such that movement of the second tapered blade actuating wedge assembly along the longitudinal axis causes each cutting blade in the second plurality of cutting blades to move perpendicular to the longitudinal axis.

The cutting blades in the first and second plurality of cutting blades can be movable between a retracted position and an extended position relative to the housing assembly. The cutting blades in the first and second plurality of cutting blades can be configured so as to collectively present a substantially continuous, outwardly-facing annular cutting edge.

According to some embodiments, the substantially continuous, outwardly-facing cutting edge is adapted to cut through a pipe or the like from an inside of the pipe in a radially outward direction as the cutting blades in the first and second plurality of cutting blades are moved from the retracted position to the extended position.

In some implementations, the first blade actuating wedges are tapered in a first direction substantially parallel to the longitudinal axis and the second blade actuating wedges are tapered in a second direction, opposite the first direction, substantially parallel to the longitudinal axis. In some implementations, the first and second blade actuating wedge assemblies are configured so that, during operation of the cutting tool, they move in opposite directions inside the housing assembly. In some implementations, the first and second blade actuating wedge assemblies are configured so that the first blade actuating wedges mesh with the second blade actuating wedges.

A typical embodiment includes a drive mechanism configured to move the first and second blade actuating wedges along the longitudinal axis. The drive mechanism may be, for example, a hydraulic drive mechanism.

In some embodiments, the hydraulic drive mechanism includes a hydraulic cylinder, a first double-acting hydraulic piston inside the hydraulic cylinder and coupled to the first blade actuating wedge assembly via a first piston shaft and a second double-acting hydraulic piston inside the hydraulic cylinder and coupled to the second blade actuating wedge assembly via a second piston shaft.

The second piston shaft, in some implementations, extends through the first piston and through the first piston shaft to couple to the second blade actuating wedge assembly.

In some implementations, the hydraulic cylinder has multiple ports, e.g., a first hydraulic fluid port near a first longitudinal end of the hydraulic cylinder, a second hydraulic fluid port near a second longitudinal end of the hydraulic cylinder, opposite the first longitudinal end and a centrally-disposed hydraulic fluid port approximately centrally-disposed relative to the first and second longitudinal ends.

According to some embodiments, a portion of the housing assembly forms a cutting head that defines a plurality of radial paths through which the cutting blades in the first and second plurality of cutting blades can move.

Some embodiments include an external support feature at a first longitudinal end of the cutting tool, by which the cutting tool can be physically supported.

Figure 1:
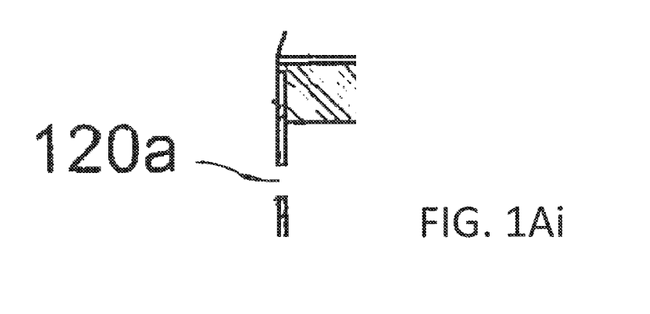

In another aspect, a drive mechanism (e.g., a drive mechanism for a cutting tool, such as shown in FIG. 1) includes a cylinder housing. A first double-acting piston is configured for reciprocal motion along an axis inside the cylinder housing. A first piston shaft extends from the first piston in a first direction along the axis. A second double-acting piston is configured for reciprocal motion along the axis inside the cylinder. A second piston shaft extends from the second piston in the first direction along the axis through the first double-acting piston and through the first piston shaft.

In some implementations, the first piston shaft extends through an end wall of the cylinder housing at a first end of the cylinder housing and wherein the second piston shaft extends through an end wall of the cylinder housing at the first end of the cylinder housing inside the first piston shaft.

In some implementations, the drive mechanism defines a first fluid port near a first longitudinal end of the hydraulic cylinder, a second fluid port near a second longitudinal end of the hydraulic cylinder, opposite the first longitudinal end and a centrally-disposed fluid port approximately centrally-disposed relative to the first and second longitudinal ends.

According to some embodiments, the centrally-disposed fluid port is configured to facilitate fluid flow into and out of a central space inside the cylinder housing between the first piston and second piston, the first fluid port is configured to facilitate fluid flow into and out of a first end space inside the cylinder housing at an opposite side of the first piston from the central space, and the second fluid port is configured to facilitate fluid flow into and out of a second end space inside the cylinder housing at an opposite side of the second piston from the central space.

The drive mechanism typically is configured for hydraulically-powered operations.

The drive mechanism may, in some implementations, be coupled to (i.e., configured to) drive a cutting tool that has a housing assembly and a first blade actuating wedge assembly inside the housing assembly and movable relative to the housing assembly along a longitudinal axis, the first blade actuating wedge assembly having a plurality of first tapered blade actuating wedges, a first plurality of cutting blades, each cutting blade in the first plurality of cutting blades being supported in a manner such that a position of the cutting blade relative to the housing assembly along the longitudinal axis is substantially fixed, wherein each cutting blade in the first plurality of cutting blades is coupled a respective one of the first tapered blade actuating wedges such that movement of the first tapered blade actuating wedge assembly along the longitudinal axis causes each cutting blade in the first plurality of cutting blades to move perpendicular to the longitudinal axis, a second blade actuating wedge assembly inside the housing assembly and movable relative to the housing assembly along the longitudinal axis, the second blade actuating wedge assembly comprising a plurality of second tapered blade actuating wedges, a second plurality of cutting blades, each cutting blade in the second plurality of cutting blades being supported in a manner such that a position of the cutting blade relative to the housing assembly along the longitudinal axis is substantially fixed, wherein each cutting blade in the second plurality of cutting blades is coupled a respective one of the second tapered blade actuating wedges such that movement of the second tapered blade actuating wedge assembly along the longitudinal axis causes each cutting blade in the second plurality of cutting blades to move perpendicular to the longitudinal axis, wherein the first piston is coupled to the first blade actuating wedge assembly the second piston is coupled to the second blade actuating wedge assembly In yet another aspect, a method includes providing a cutting tool, positioning the cutting tool inside a pipe (e.g., metallic or other tube-shaped or similarly-shaped material); and causing first and second tapered blade actuating wedge assemblies in the cutting tool to move in opposite directions along the longitudinal axis to cause each one of a plurality of cutting blades in the cutting tool to move between a retracted position and an extended position relative to the housing assembly. In a typical implementation, this cuts through the pipe.

In a typical implementation, the cutting includes a housing assembly, a first blade actuating wedge assembly inside the housing assembly and movable relative to the housing assembly along a longitudinal axis, the first blade actuating wedge assembly comprising a plurality of first tapered blade actuating wedges; a first plurality of cutting blades, each cutting blade in the first plurality of cutting blades being supported in a manner such that a position of the cutting blade relative to the housing assembly along the longitudinal axis is substantially fixed; a second blade actuating wedge assembly inside the housing assembly and movable relative to the housing assembly along the longitudinal axis, the second blade actuating wedge assembly comprising a plurality of second tapered blade actuating wedges; and a second plurality of cutting blades, each cutting blade in the second plurality of cutting blades being supported in a manner such that a position of the cutting blade relative to the housing assembly along the longitudinal axis is substantially fixed.

Moreover, each cutting blade in the first and second plurality of cutting blades is coupled a respective one of the tapered blade actuating wedges such that movement of the first and second tapered blade actuating wedge assemblies along the longitudinal axis causes each cutting blade to move perpendicular to the longitudinal axis.

In a typical implementation, the method includes cutting through the pipe with the cutting blades, collectively.

A number of relative terms (e.g., upper, lower, above, below, top, bottom, etc.) are used throughout this specification. Unless otherwise apparent, these terms should be understood as referring to the relative arrangements of components when the cutting tool is vertically oriented and hanging from its lifting ring 102. In general, these relative terms should not be construed as limiting the scope of the present disclosure.

In some implementations, one or more of the following advantages are present.

For example, a cutting tool is provided that can cut through a pipe to sever a longitudinal section of the pipe from the inside of the pipe in an outward direction. This ability (i.e., to cut through a pipe from the inside out) is particularly helpful where a pipe to be cut is closely positioned to other pipes or structures that limit access to the outer surface of the pipe for cutting purposes.

The cutting tool can be lowered into the pipe and operated remotely from a hydraulic control station, for example. This is done by causing hydraulic fluid to flow to and from the cutting tool via hydraulic tubing when the cutting tool is positioned inside the pipe.

The cutting tool can provide quick, simple cuts and is relatively simple from an operational perspective.

In a typical implementation, the cutting tool can be operated underwater to any depth up to, for example, 1000 feet from a ship mounted hydraulic power pack with an umbilical. Moreover, in a typical implementation, the cutting tool can be operated at virtually unlimited depth when powered by an ROV (remotely operated vehicle).

Moreover, in a typical implementation, the cutting head of the cutting tool is removable and replaceable. Moreover, different cutting tools may be provided to cut pipes of different sizes.

Other features and advantages will be apparent from the description and drawings, and from the claims.

BRIEF DESCRIPTION OF THE FIGURES

FIGS. 1Ai, 1Aii, and 1Aiii represent enlarged fragmentary views of portions of the exemplary cutting tool as shown in FIG. 1A.

FIGS. 6A-6A, 6B-6B, 6C-6C and 6D-6D are various cross-sectional views of the exemplary upwardly-tapered blade actuating wedge assembly in FIG. 6.

FIGS. 7A-7A, 7B-7B, 7C-7C, 7D-7D, 7E-7E and 7F-7F are various cross-sectional views of the exemplary downwardly-tapered blade actuating wedge assembly in FIG. 7.

DETAILED DESCRIPTION

Figures 1A, 1B:
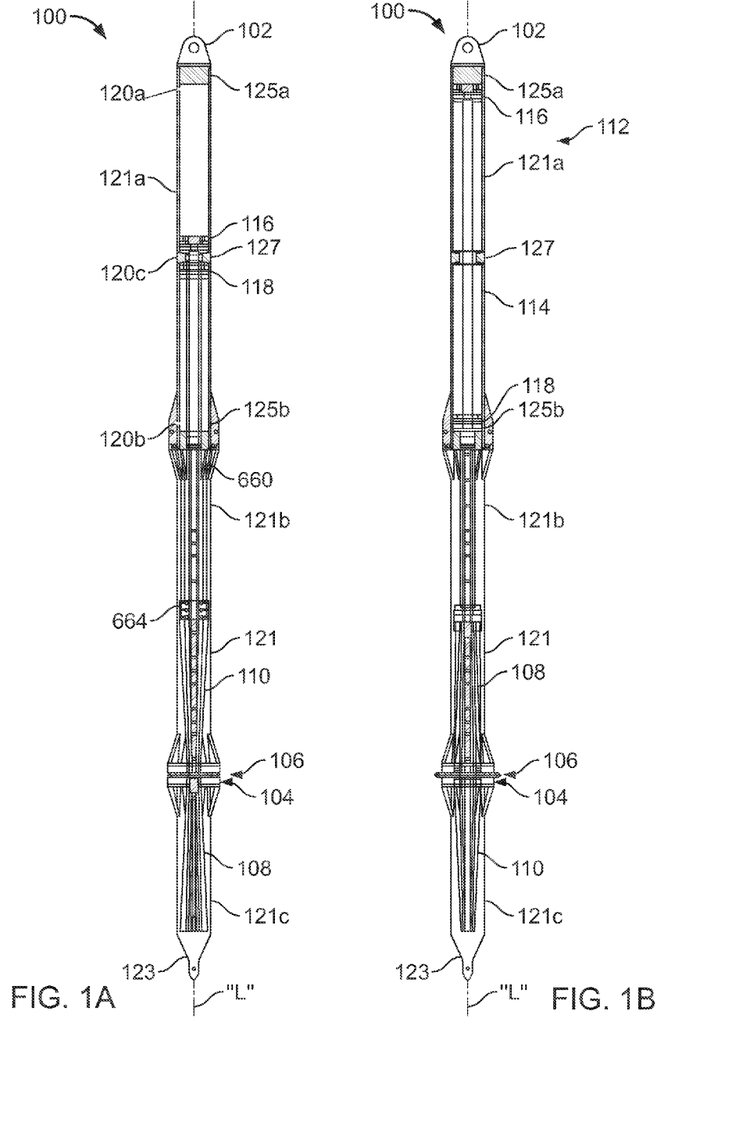
FIGS. 1A and 1B are cross-sectional views of an exemplary cutting tool.
Figures 2A, 2B, 3A, 3B:
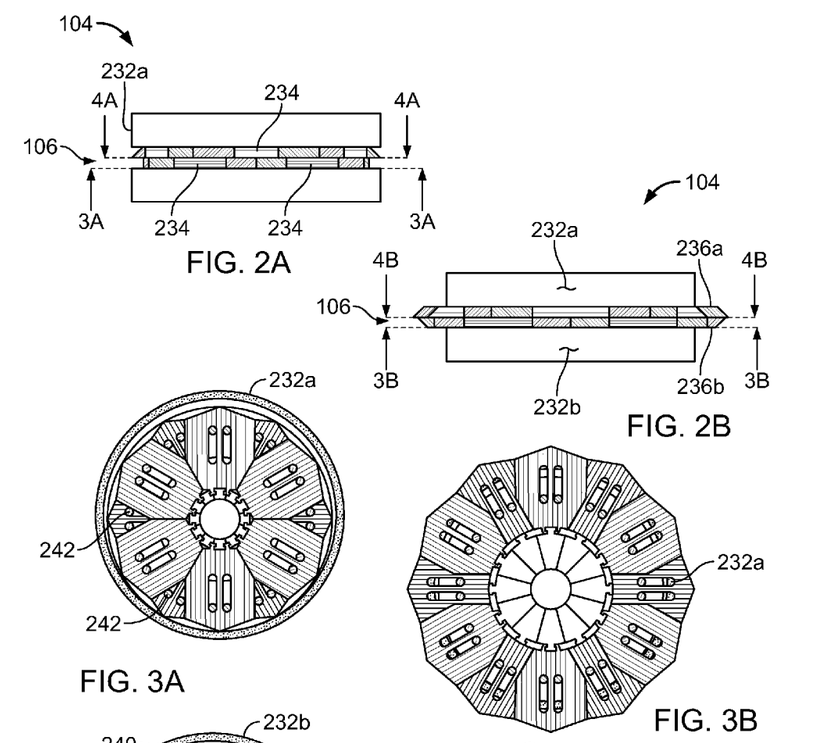
FIGS. 2A and 2B are close-up, side views of an exemplary cutting head assembly from the cutting tool in FIGS. 1A and 1B, respectively.
FIGS. 3A and 3B are cross-sectional views of the exemplary cutting head assembly in FIGS. 2A and 2B, respectively.

FIGS. 1A and 1B show an exemplary implementation of a cutting tool 100 that is adapted to cut through a pipe from the inside of the pipe in an outward direction to sever a section of the pipe. The ability to cut through a pipe in this manner can be particularly helpful, for example, when the pipe that is being cut is closely surrounded by other pipes or other structures that would otherwise prevent or limit access to the outside surface of the pipe for cutting in an inward direction.

The cutting tool 100 has a lifting ring 102 at an upper end thereof that can be used to support the cutting tool 100, for example, as it is being lowered into a vertically-disposed section of pipe that is to be cut. The present disclosure uses a number of terms, such as "upper," "lower," "above," "below," etc. to describe the relative positions of various components in the cutting tool 100. Unless otherwise indicated, these terms describe the relative positions of the various components as they would be when the cutting tool 100 is being suspended in a vertical configuration from its lifting ring 102.

The illustrated cutting tool 100 has a housing assembly 102 and a cutting head 104 near a lower end of the housing assembly 102. The cutting head 104 supports the cutting blades 106, which are arranged in an orbital manner about a longitudinal axis ("L") of the cutting tool 100. The cutting head 104 maintains the longitudinal position of the cutting blades 106 relative to the housing assembly 102 relatively constant, while enabling the cutting blades to move in a radial direction between a retracted position, as shown in FIG. 1A, and an extended position, as shown in FIG. 1B.

In the retracted position, the outwardly-facing cutting edges of the cutting blades 106 are retracted relative to the housing assembly 102 and outer perimeter of the cutting head 104. Therefore, when the cutting blades 106 are in the retracted position, the cutting tool can be moved, for example, into a cutting position inside a pipe to be cut without risking damage to the cutting blades. This is because, in the retracted position, the cutting edges of the cutting blades 106 do not contact the pipe.

Once inside the pipe, the cutting tool 100 can be operated to cause the cutting blades 106 to move in an outward manner from the retracted position to the extended position. In a typical implementation, when the cutting blades are moved in this manner, the outwardly-facing cutting edges of the cutting blades collectively cut through an entire perimeter of the pipe. Thus, in a typical implementation, the cut can accomplished relatively quickly and relatively simply.

The cutting tool 100 includes a blade actuating mechanism that causes the blades 106 to move between the retracted position and extended position. In the illustrated implementation, the blade actuating mechanism includes a pair of blade actuating wedge assemblies 108 and 110. Each blade actuating wedge assembly 108, 110 extends at least partially through a centrally-disposed opening in the cutting head 104. Moreover, each blade actuating wedge assembly 108, 110 has multiple blade actuating assemblies, each of which is slidably coupled to a corresponding one of the cutting blades 106.

In the illustrated implementation, the tapered blade actuating wedges of blade actuating wedge assembly 108 are tapered in an upward direction, whereas the tapered blade actuating wedges of blade actuating wedge assembly 110 are tapered in a downward direction.

The blade actuating wedge assemblies 108, 110 are able to move in a direction along the cutting tool's longitudinal axis ("L") in opposite directions relative to one another. It is this movement of the blade actuating wedge assemblies 108, 110 that causes the blades to move between the retracted position (FIG. 1A) and the extended position (FIG. 1B).

More particularly, the cutting tool 100 is arranged so that the longitudinal motion of the blade actuating wedge assemblies 108, 110 causes the blades to move in a direction substantially perpendicular to the longitudinal motion. As the blade actuating wedge assemblies 108, 110 move in the longitudinal direction relative to the blades, the tapered blade actuating wedges (which may be coupled to the blades with a slidable dovetail-type of connection, for example) slide along the blades. This causes the position of the blades to change perpendicular to the longitudinal motion depending on the position of the tapered blade actuating wedges relative to their respective blades.

In the illustrated implementation, blade actuating wedge assembly 108 moves in an upward direction while blade actuating wedge assembly 110 moves in downward to move the cutting blades 106 to move from the retracted position (FIG. 1A) to the extended position (FIG. 1B). Conversely, in the illustrated implementation, blade actuating wedge assembly 108 moves in a downward direction while blade actuating wedge assembly 110 moves in an upward direction to move the cutting blades 106 to move from the extended position (FIG. 1B) to the retracted position (FIG. 1A).

Since the blade actuating wedge assemblies 108, 110 are designed to simultaneously move in opposite directions in the housing assembly 102 past one another, each blade actuating wedge is configured so that it does not interfere with motion of the other blade actuating wedge. In a typical implementation, the blade actuating wedge assemblies 108, 110 are designed so that they can mesh with one another as they move simultaneously in opposite directions inside the housing assembly 102 past one another.

FIGS. 2A, 2B, 3A, 3B, 4A and 4B show close-up and cross-sectional views of the cutting head 104 and cutting blades 106 from FIGS. 1A and 1B, respectively.

The cutting head 104 includes an upper blade support member 232a and a lower blade support member 232b, with a space therebetween to accommodate the cutting blades 106 as well as blade guide elements 234 that define guide paths for the cutting blades 106 as the cutting blades 106 move between the retracted position and extended position.

In the illustrated implementation, the cutting blades 106 are sized and arranged about a perimeter of the cutting tool 100 in such a manner that they collectively present a single, substantially uninterrupted, outwardly-facing cutting edge. Thus, the cutting blades 106 are generally configured so that they can cut through a pipe, or the like, in one outward movement (e.g., by moving from the retracted position to the extended position).

The illustrated cutting tool 100 includes two rows 236a, 236b of alternating cutting blades 106 and blade guide elements 234.

There are a total of twelve cutting blades 106, with six cutting blades 106 in each row 236a, 236b. The cutting blades 106 in each row 236a, 236b are evenly spaced about the perimeter of the cutting tool 100 with one cutting blade 106 positioned every 60 degrees. The arrangement of cutting blades 106 in the upper row 236a is angularly offset relative to the arrangement of cutting blades 106 in the lower row 236b by approximately 30 degrees.

Similarly, there are a total of twelve blade guide elements 234, with six blade guide elements 234 in each row. Each pair of adjacent blade guide elements 234 in a row defines a path within which one of the cutting blades 106 can move between the retracted and extended positions. The blade guide elements 234 in each row are evenly spaced about the perimeter of the cutting tool 100 with one blade positioned every 60 degrees. The arrangement of blade guide elements 234 in the upper row is angularly offset relative to the arrangement of blade guide elements 234 in the lower row 236b by approximately 30 degrees.

In the illustrated implementation, the blade guide elements 234 in the upper row 236a are securely fastened to the upper blade support member 232a and the blade guide elements 234 in the lower row 236b are securely fastened to the lower blade support member 232b.

Each cutting blade 106 in the upper row 236a is coupled at an inner edge thereof to one of the blade actuating wedges of the downwardly-tapered blade actuating wedge assembly 108 and each cutting blade 106 in the lower row 236b is coupled to one of the blade actuating wedges of the upwardly-tapered blade actuating wedge assembly 110. As illustrated, the distance of the blades from the axial centerline of the cutting tool depends on the axial position of the tapered blade actuating wedges relative to the blades (i.e., where along the tapered blade actuating wedges the blades are).

Each cutting blade 106 has a pair of slots 240, each slot 240 being elongated in the direction that the cutting blade 106 moves between the retracted and extended positions. A fastening element 242 extends through each respective slot 240 and into an adjacent one of the blade support members 232a or 232b. Thus, the fastening elements 242 that extend through the slots 240 of the cutting blades 106 in the upper row 236a extend into the upper blade support member 232a and the fastening elements 242 that extend through the slots 240 of the cutting blades 106 in the lower row 236b extend into the lower blade support member 232b.

Referring again to FIGS. 1A and 1B, the blade actuating wedge assemblies 108, 110 are driven by a hydraulically-powered drive assembly 112 at an upper portion of the cutting tool 100.

The illustrated drive assembly 112 includes a hydraulic cylinder 114, an upper double-acting piston 116 inside the hydraulic cylinder 114 and a lower double acting piston 118 inside the hydraulic cylinder 114. Each of these pistons 116, 118 is a double-acting piston by virtue of the fact that a working fluid (e.g., hydraulic fluid) acts alternately on both sides of the piston.

The lower double-acting piston 118 is coupled to the downwardly-tapered blade actuating wedge assembly 110 by a lower piston shaft. The upper double-acting piston 116 is coupled to the upwardly-tapered blade actuating wedge assembly 108 by an upper piston shaft. In this regard, the upper piston shaft extends through the lower double-acting piston and through the lower piston shaft to the upwardly-tapered blade actuating wedge assembly 108.

A typical implementation includes a seal inside the hollow portion of the lower piston shaft to seal the area where the upper piston shaft passes into the lower piston shaft. The seal can be implemented in a variety of different ways.

The hydraulic cylinder 114 has three hydraulic fluid supply/return ports: an upper hydraulic fluid port 120a, a lower hydraulic fluid port 120b and a centrally-disposed hydraulic fluid port 120c. The upper hydraulic fluid port 120a is configured to supply or return hydraulic fluid to or from the space inside the hydraulic cylinder 114 above the upper double-acting piston 116. The lower hydraulic fluid port 120b is configured to supply or return hydraulic fluid to or from the space inside the hydraulic cylinder 114 below the lower double-acting piston 118. The centrally-disposed hydraulic fluid port 120c is configured to supply or return hydraulic fluid to or from the space inside the hydraulic cylinder 114 between the upper and lower double-acting pistons 116, 118.

The upper and lower hydraulic pistons 116, 118 are substantially free to move up and down inside the hydraulic cylinder. Hydraulic fluid can be pumped into or released out of the various hydraulic fluid ports 120a, 120b, and 120c to control the positions of the upper and lower pistons inside the hydraulic cylinder.

In general, the drive assembly 112 is operable to simultaneously drive the upwardly-tapered actuating wedge assembly 108 and the downwardly-tapered actuating wedge assembly 110 in opposite directions. For example, to cause the cutting blades 106 to move from the retracted position to the extended position, the drive assembly 112 drives the upwardly-tapered actuating wedge assembly 108 in an upward direction and simultaneously drives the downwardly-tapered actuating wedge assembly 110 in a downward direction.

Both pistons and rods moving in opposite directions and independently of each other (e.g., in a typical implementation, there is no mechanical linkage to keep them traveling the same distance at the same rate, or in a synchronized manner). The center port is shared by the pistons and the oil pressure and flow rate is shared by the pistons, but the top and bottom ports feed voids in the cylinder that are separated from one another. Therefore, in a typical implementation, synchronization of piston movement is facilitated with an external proportioning valve (not shown in the figures) that is generally operable to substantially equalize the flow and pressure of oil going in and out of the top and bottom ports.

Additionally, to cause the cutting blades 106 to move from the extended position to the retracted position, the drive assembly 112 drives the upwardly-tapered actuating wedge assembly 108 in a downward direction and drives the downwardly-tapered actuating wedge assembly 110 in an upward direction.

The upper and lower double-acting pistons 116, 118 can be moved from their positions in FIG. 1A to their positions in FIG. 1B by injecting pressurized hydraulic fluid into the centrally-disposed hydraulic fluid port 120c and enabling hydraulic fluid to flow out of the upper and lower hydraulic fluid ports 120a, 120b. Moreover, the upper and lower double-acting pistons 116, 118 can be moved from their positions in FIG. 1B to their positions in FIG. 1A by injecting pressurized hydraulic fluid into the upper and lower hydraulic ports 120a, 120b and enabling hydraulic fluid to flow out of the centrally-disposed hydraulic fluid port 120c.

In a typical implementation, external hydraulic fluid conduits (not shown) would be connected to the hydraulic fluid ports 120a, 120b, 120c and configured to facilitate the supply and return of hydraulic fluid to and from the hydraulic cylinder 114 to support the cutting tool's operations. Typically, the external hydraulic fluid conduits would be coupled to the hydraulic fluid ports 120a, 120b, and 120c prior to positioning the cutting tool 100 inside the pipe to be cut.

Figure 4A:
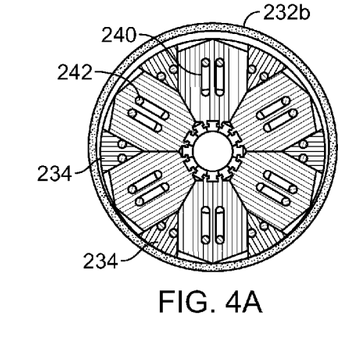
FIGS. 4A and 4B are cross-sectional views of the exemplary cutting head assembly in FIGS. 2A and 2B, respectively.
Figure 4B:
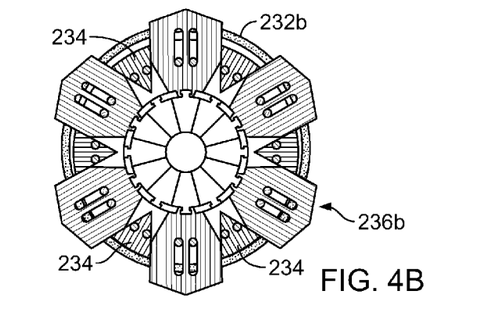

FIGS. 4A to 4C show an exemplary implementation of a single cutting blade 106 from the cutting tool 100 of FIGS. 1A and 1B.

The illustrated cutting blade 106 has a cutting edge 440 at a front end thereof that extends across an entire width of the blade 106. There are two guide slots 240 that extend through the cutting blade 106 and are elongated in the direction that the cutting blade 106 would move in the cutting tool 100 between the retracted and extended positions.

A coupling feature 442 is provided at an opposite end of the cutting blade 106 from the cutting edge 440. The coupling feature 442 is configured to couple to a corresponding blade actuating wedge on one of the blade actuating wedge assemblies 108, 110 in the cutting tool 100. In the illustrated cutting blade 106, the coupling feature 442 forms a substantially T-shaped opening.

Thus, the illustrated coupling feature 442 is configured to receive a correspondingly T-shaped portion of a blade actuating wedge on one of the blade actuating wedge assemblies 108, 110 to form a dovetail-type connection between the cutting blade 106 and the blade actuating wedge. The dovetail-type connection allows the correspondingly T-shaped portion of a blade actuating wedge to slide through the T-shaped opening in a direction that would be into the page in FIG. 4A.

In the illustrated implementation, the parts of the wedges that act upon the back of the blade are shaped in a T so that the T shape of the cutout in the back of the blade will pull the blade back into the cutting head after the cut is made. In some implementations, space is very tight so that there is generally no room for springs or anything else that might perform this function. The upper wedge travels around the core of the lower wedge and between the wedges of the lower wedge has nothing tying the bottom points together. So if a blade actuated by the top wedge gets stuck or is stiffer than the rest to retract one of the (fingers) of the upper wedge will start to move outward from its concentric spot in the group and it may become damaged along with not retracting the blade properly. This is solved by using the T shape on the bottom of the upper wedge fingers and a T shape on the bottom of the grooves where the upper wedge travels not allowing the upper wedge fingers to be pulled outward or out of the concentric circle with the others.

Figure 5A:
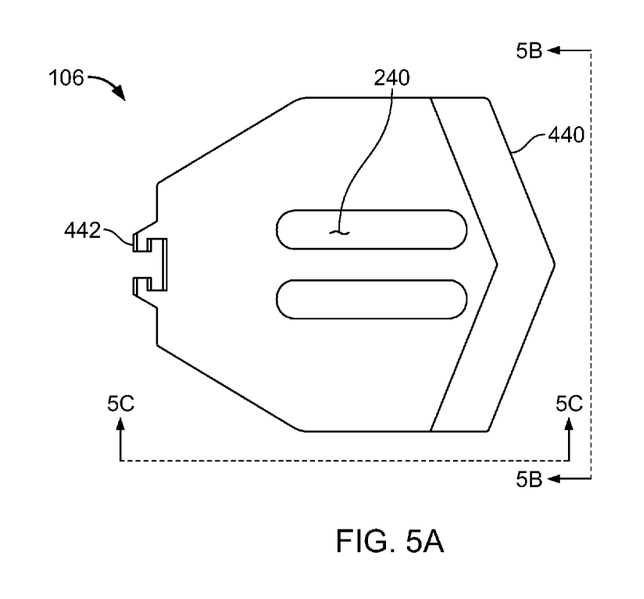
FIGS. 5A through 5C are views of an exemplary cutting blade from the exemplary cutting tools of FIGS. 1A and 1B.
Figure 5B:
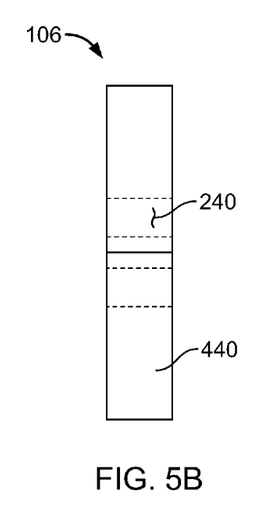
Figure 5C:
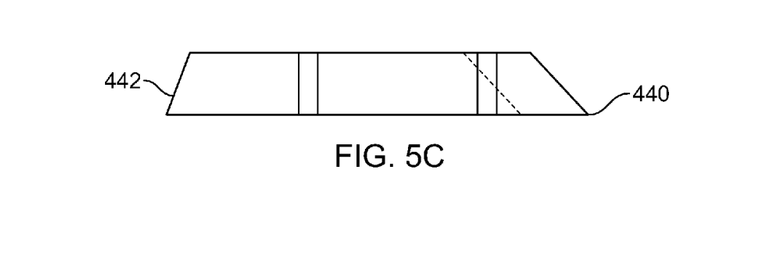

FIG. 5 shows an exemplary implementation of the upwardly-tapered blade actuating wedge assembly 110 in the cutting tool 100 of FIGS. 1A and 1B. The illustrated blade actuating wedge assembly 110 has a central hub portion 550 that extends in a longitudinal direction (i.e., along axis "L" in FIG. 5).

Multiple wedge segments 552 project outwardly from the central hub portion 550, each wedge segment 552 projecting from the central hub portion 550 in direction substantially perpendicular to the longitudinal direction ("L "). The wedge segments are substantially evenly spaced about a perimeter of central hub portion 550. More particularly, in the illustrated implementation, six wedge segments 552 extend outward from the central hub portion 550 with a different wedge segment approximate every 60 degrees (e.g., θ in FIG. 5 is approximately 60 degrees).

Each wedge segment 552 in the illustrated implementation extends along an entire length of the upwardly-tapered actuating wedge assembly 110. The cross-sectional profile of each wedge segment 552 as viewed in the direction of the longitudinal direction (see sectional views 6A-6A and 6B-6B) changes along its length. More particularly, the height of the wedge segments 552 relative to the central hub portion 550 becomes smaller. This produces the overall generally tapered appearance of the upwardly-tapered actuating wedge assembly 110.

Each pair of adjacent wedge segments 552 defines a longitudinal opening therebetween that extends in the longitudinal direction ("L"). Each path is sized and shaped to accommodate a corresponding wedge segment of the downwardly-tapered actuating wedge assembly 108 moving through the path in the longitudinal direction ("L").

In the illustrated implementation, each pair of adjacent wedges 552 is configured so as to define, as part of the longitudinal opening 553 therebetween, a flared portion 555 of the longitudinal opening 553 near a bottom of the longitudinal opening 553. In a typical implementation, the flared portion of the longitudinal opening 553 is configured to slidably engage a portion of a wedge segment on the downwardly-tapered actuating wedge assembly.

The outer edge of each wedge segment 552, relative to the central hub portion 550, has a blade actuating wedge 554 that is configured to engage a corresponding coupling feature 442 on one of the cutting blades 106. More particularly, as shown in partial sectional view 6C-6C, each blade actuating wedge 554 in the illustrated implementation is substantially T-shaped with a relatively narrow neck portion 554a and a larger head portion 554b above the neck portion.

In a typical implementation, the coupling feature 442 of a cutting blade 106 is configured so that it can slide in the longitudinal direction ("L") over the blade actuating wedges 554 of one of the wedge segments 552. More particularly, the coupling feature 442 of the cutting blade 106 can wrap around the head portion of the blade actuating wedge 554 and extends at least partially in toward the neck portion.

Thus, cutting blades 106 can be coupled to the wedge segments 552 in a manner that permits relative movement between the cutting blades 106 and wedge segments 552 when, for example, the cutting blades 106 are being moved from the retracted position (as shown in FIG. 1A) to the extended position (as shown in FIG. 1B).

As shown, the upwardly-tapered actuating wedge assembly 110 has an opening 558 at an upper end thereof for coupling (e.g., screwing) the upwardly-tapered actuating wedge assembly 110 onto a lower end of the upper piston shaft. The illustrated opening 558 is centrally disposed in the central hub portion 550 of the wedge assembly 110 and extends short distance in the longitudinal direction ("L").

The illustrated upwardly-tapered actuating wedge assembly 110 has three threaded holes 556 shown in FIG. 5 and the cross-sectional view in 6D-6D. Each threaded hole 556 extends in a substantially radial direction, into the central hub portion 550 of the wedge assembly 110. The threaded holes 556 are provided to facilitate lifting of the assembly.

Figure 6:
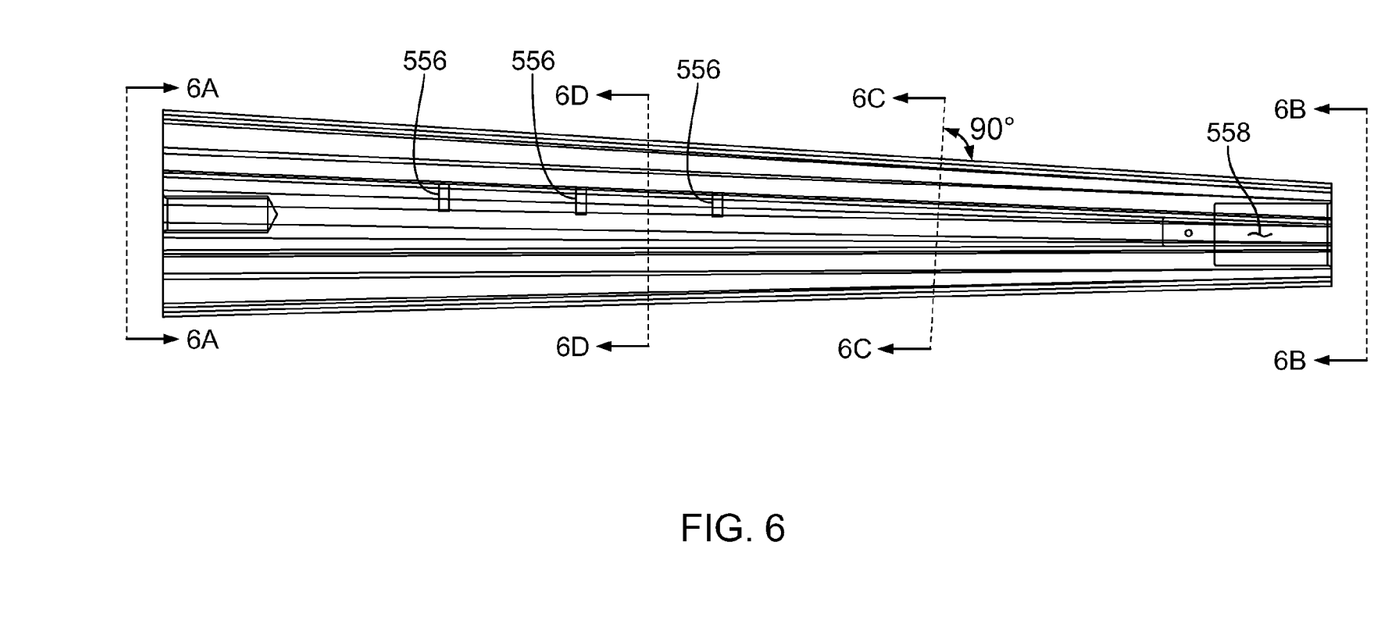
FIG. 6 is a detailed, cross-sectional view of an exemplary upwardly-tapered blade actuating wedge assembly from the exemplary cutting tool in FIGS. 1A and 1B.
Figure 6A:
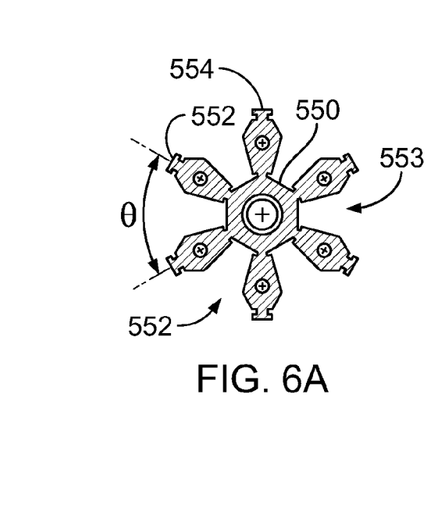
Figure 6B:
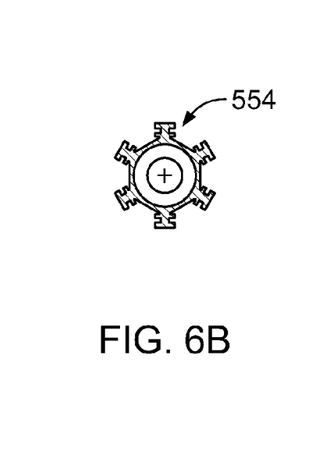
Figures 6C, 6D:
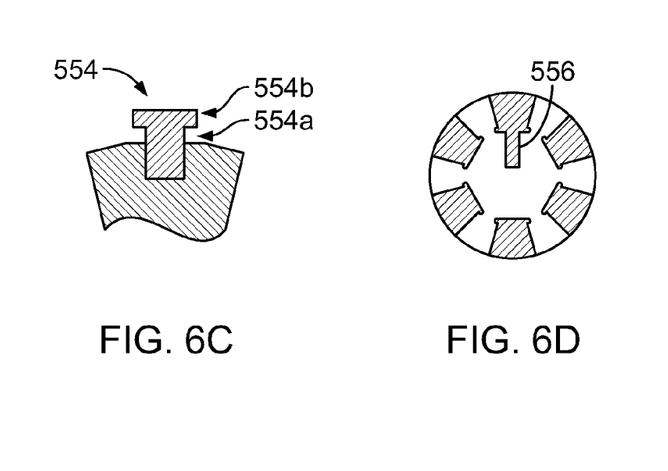

FIG. 6 shows an exemplary implementation of the downwardly-tapered blade actuating wedge assembly 108 in the cutting tool 100 of FIGS. 1A and 1B.

The illustrated wedge assembly 108 has an upper coupling plate 660, multiple wedge segments 662 that extend in a longitudinal direction ("L") from the upper coupling plate 660 to a lower end of the assembly 108 and a wedge support shroud 664 that wraps around the wedge segments 662 approximately midway between the upper coupling plate 660 and the lower end of the assembly 108.

In the illustrated implementation, each wedge segment 662 has an upper section 662a where the wedge segment is substantially straight (i.e., non-tapered) and a lower section 662b where the wedge segment is tapered in a downward direction along the longitudinal axis ("L").

Figure 7:
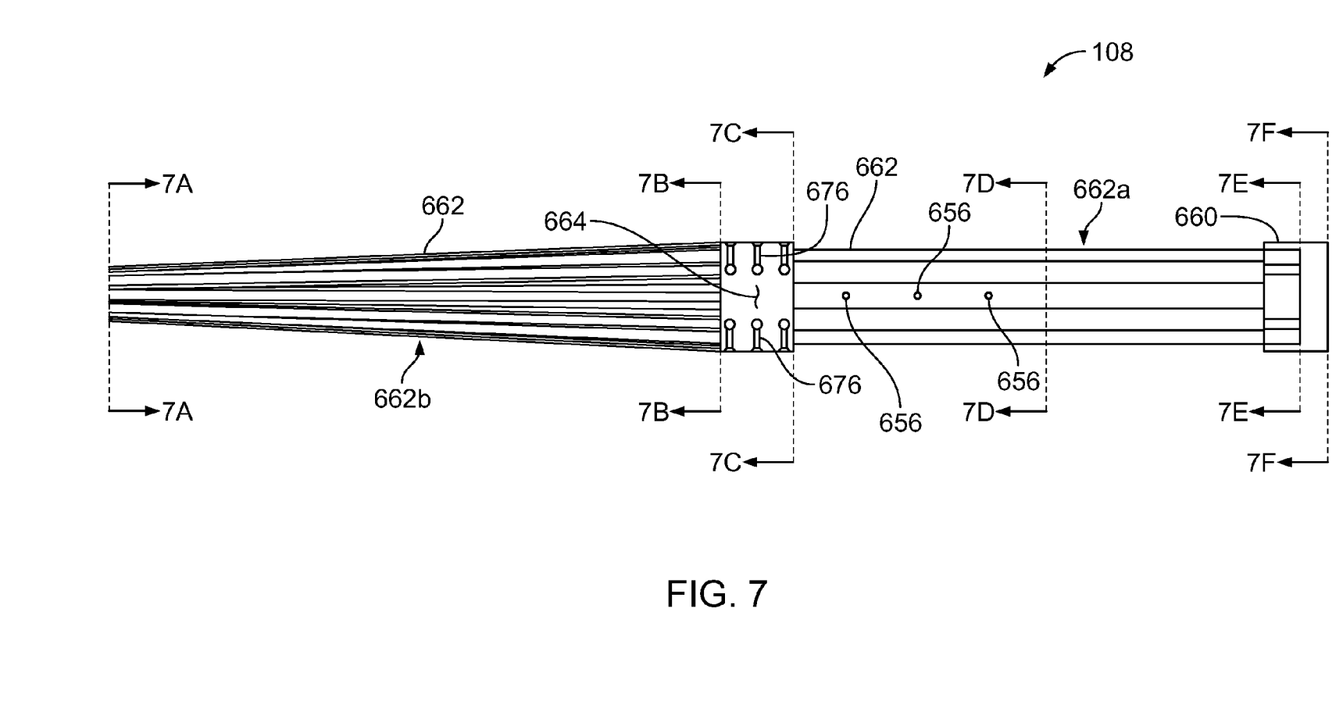
FIG. 7 is a detailed, cross-sectional view of an exemplary downwardly-tapered blade actuating wedge assembly from the exemplary cutting tool in FIGS. 1A and 1B.
Figure 7A:
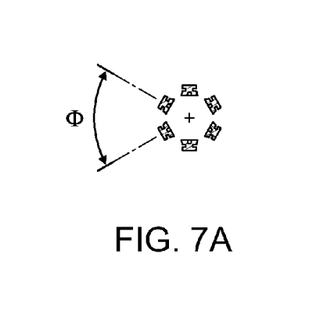
Figure 7B:
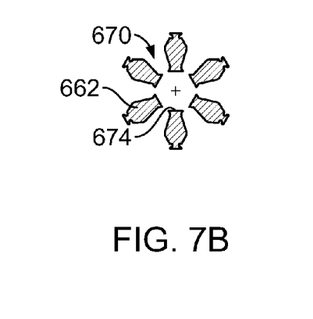
Figure 7C:
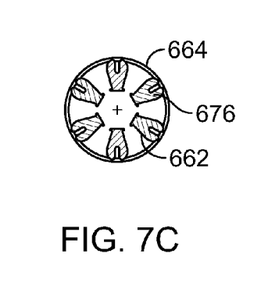
Figure 7D:
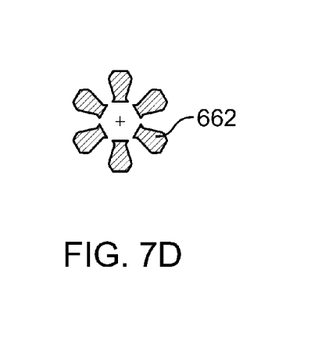
Figure 7E:
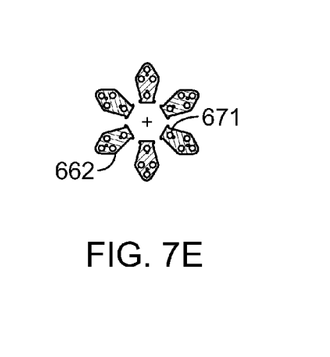
Figure 7F:
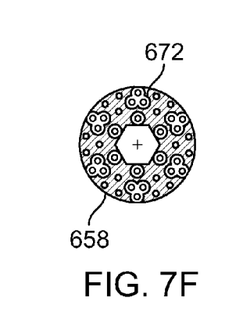

There are multiple wedge segments 662 that are substantially evenly spaced about a perimeter of the wedge assembly 108. More particularly, in the illustrated implementation, there six wedge segments 662 with a different wedge segment approximate every 60 degrees (e.g., Φ in sectional view 7A-7A is approximately 60 degrees).

Although the angular separation of wedge segments 662 in the downwardly-tapered actuating wedge assembly 108 is the same as the angular separation of wedge segments 552 in upwardly-tapered actuating wedge assembly 110 (i.e., approximately 60 degrees between adjacent wedges), the arrangement of wedge segments 662 in wedge assembly 108 is offset from the arrangement of wedge segments 552 in wedge assembly 110. This offset enables the wedge segments 552 in wedge assembly 110 to mesh with the wedge segments 662 in wedge assembly 108 when the wedge assemblies 108, 110 are moving in opposite directions past one another in the longitudinal direction.

More particularly, when meshed, the tapered portion of each wedge segments 662 in wedge assembly 108 fits into and can slide along one of the longitudinal openings formed by adjacent wedges 552 in the other wedge assembly 110. Likewise, when meshed, each wedge segment 552 in wedge assembly 110 fits into and can slide along a longitudinal opening (e.g., 670 in sectional view 7B-7B) between adjacent wedge segments 662 in wedge segment 108.

The wedge segments 662 are securely fastened at their upper ends to the upper coupling plate 660. More particularly, as shown in sectional views 7E-7E and 7F-7F, the upper end of the wedge segments 662 has threaded holes 671 that extend axially into the upper end of the wedge segments 662. These holes 671 can be aligned with corresponding holes 672 in the upper coupling plate 660 to receive fastening elements (e.g., screws or the like) for fastening the wedge segments to the upper coupling plate 660.

In the illustrated implementation, the upper section 662a of wedge segments where the wedge segments 662 are substantially straight extends from the upper coupling plate 660 through the wedge support shroud 664. The cross-sectional profile of each wedge segment 662, shown in sectional view 7D-7D, is substantially constant along the entire length of the upper section 662a.

The lower section 662b of wedge segments where the wedge segments are tapered extends from a lower end of the wedge support shroud 664 to the lower end of the wedge assembly 108. In this lower section 662b, the cross-sectional profile of each wedge segment 662 as viewed in the direction of the longitudinal direction (see sectional views 7A-7A and 7B-7B) changes along its length. More particularly, the height of the wedge segments 662 relative in a direction perpendicular to the longitudinal direction ("L") becomes smaller. This produces the overall generally tapered appearance of the downwardly-tapered actuating wedge assembly 108.

Each pair of adjacent wedge segments 662 defines a longitudinal opening 670 therebetween that extends in the longitudinal direction ("L"). Each longitudinal opening is sized and shaped to accommodate a corresponding wedge segment of the upwardly-tapered actuating wedge assembly 110 moving through the longitudinal opening 670 in the longitudinal direction ("L").

Each wedge segment 662 in the lower section 662b of wedge segments has a flared inner edge 674. Each flared inner edge 674 is configured to engage a corresponding flared portion 555 near the inner portion of a longitudinal opening 553 in the other wedge assembly 110. More particularly, the flared inner edge 674 of each wedge segment can slide into a corresponding flared portion 555 of a longitudinal opening 553 in a mating wedge assembly 110.

The outer edge of each wedge segment 662, relative to a central, longitudinal axis of the wedge segments 662, has a blade actuating wedge 654 that is configured to engage a corresponding coupling feature 442 on one of the cutting blades 106. More particularly, as shown in partial sectional view 7B-7B, each blade actuating wedge 654 in the illustrated implementation has a substantially T-shaped portion with a relatively narrow neck portion 654a and a larger head portion 654b above the neck portion.

In a typical implementation, the coupling feature 442 of a cutting blade 106 is configured so that it can slide in the longitudinal direction ("L") over the blade actuating wedges 654 of one of the wedge segments 662. More particularly, the coupling feature 442 of the cutting blade 106 can wrap around the head portion of the blade actuating wedge 654 and extends at least partially in toward the neck portion.

Thus, cutting blades 106 can be coupled to the wedge segments 662 in a manner that permits relative movement between the cutting blades 106 and wedge segments 662 when, for example, the cutting blades 106 are being moved from the retracted position (as shown in FIG. 1A) to the extended position (as shown in FIG. 1B).

In the illustrated implementation, the wedge support shroud 664 extends around and provides supports to the wedge segments 662 to help prevent the wedge segments 62 from bending. As shown, for example, in the cross-sectional view of 7C-7C, the wedge support shroud 664 is coupled to the wedge segments 662 by screws 676 that extend through the wedge support shroud 664 and into corresponding threaded holes in the wedge segments.

As shown in the cross-sectional view of 7F-7F, for example, the upper coupling plate 660 has openings 658 to accommodate fastening elements for fastening the coupling plate (and the rest of the wedge assembly 108) to a lower end of the lower piston shaft. The illustrated opening 558 is centrally disposed in the central hub portion 550 of the wedge assembly 110 and extends short distance in the longitudinal direction ("L").

The illustrated downwardly-tapered actuating wedge assembly 108 has three threaded holes 656. Each threaded hole 556 extends in a substantially radial direction, into the central hub portion 550 of the wedge assembly 110. The threaded holes 556 are provided to facilitate lifting of the assembly.

Referring again to FIGS. 1A and 1B, the illustrated cutting tool 100 has a multi-part housing assembly 121 that includes: an upper housing portion 121a, a middle housing portion 121b, part of the cutting tool 104 and a lower housing portion 121c.

The upper housing portion 121a forms the lifting ring 102 and the hydraulic cylinder 114.

The middle housing portion 121b is coupled (e.g., with a bolted connection or the like) to the lower end of the upper housing portion 121a. In some implementation, the middle housing portion 121b is formed from two halves, separable from one another at a seam that extends along the cutting tool's longitudinal axis ("L").

The cutting head 104 is coupled (e.g., by a bolted connection or the like) to a lower end of the middle housing portion 121b.

The lower housing portion 121c is coupled (e.g., by a bolted connection or the like) to a lower end of the cutting head 104.

The middle housing portion 121b and the lower housing portion 121c act as a protective shroud for the portions of the wedge assemblies 108, 110 contained therein. Moreover, the lower housing assembly has a tapered lower end 123. The tapered lower end 123 makes it easier, for example, to lower the cutting tool 100 into a pipe that is to be cut.

There are sealing glands 125a, 125b at the upper and lower ends of the hydraulic cylinder. The sealing glands 125a, 125b are configured to substantially prevent leakage of hydraulic fluid out of the hydraulic cylinder. The sealing gland 125b has a longitudinal opening through which the lower piston shaft (which contains the upper piston shaft) extends and within which the lower piston shaft can reciprocate without substantially compromising the sealing quality of the sealing gland 125b.

A piston stopper 127 is positioned in a longitudinal center of the hydraulic piston corresponding, in the illustrated implementation, to a position that is approximately top dead center for the upper and lower pistons.

A number of embodiments of the invention have been described. Nevertheless, it will be understood that various modifications may be made without departing from the spirit and scope of the invention.

For example, the cutting tool can include a different number of cutting blades than described here. Moreover, the cutting blades can be arranged about a perimeter of the cutting tool in a different manner than disclosed herein.

For example, the present disclosure describes a cutting tool that has twelve blades with an angular separation of wedges of approximately 60 degrees. This arrangement may, for example, be suitable for cutting through a 24" pipe. The present disclosure is not limited to this specific arrangement. For example, in a cutting tool adapted to cut a larger pipe (e.g., 36" or 48"), the cutting tool may have 16 blades that are 45 degrees apart from one another. Moreover, a smaller unit may only have only 8 blades. Of course, the cutting can include virtually any number of blades and the spacing between the blades can vary considerably.

The specific shape of each cutting blades can vary considerably. For example, the cutting blades may have wider or narrower outwardly-facing cutting edges than disclosed herein. Likewise, the cutting edges themselves can be contoured in a number of ways, such as curved along a substantially smooth radius or substantially straight. In some implementations, the cutting edges can be serrated or have some other variable cutting surface. All other dimensions of the blades, such as their length, width and thickness, can vary considerably.

Moreover, the physical configuration of the gripping features and corresponding wedges that the gripping features engage can vary. For example, in some implementations, the gripping feature on a blade may be a hole that extends in a substantially longitudinal direction through the blade and the corresponding portion of the wedge that engages the gripping feature may be a rod configured to extend through the hole. In such instances, the hole could be any shape, such as a rectangle, circle, triangle, etc.

The cutting tool can include a different number of wedges than disclosed herein. For example, in some implementations, the cutting tool can have four, eight, ten, fourteen, etc. wedges. In general, the number of wedges will be equal to the number of blades in the cutting tool. However, this is not necessarily required. For example, in some implementations, there may be more than one cutting blade coupled to each one of the wedges.

In some implementations, the blades will be configured in such a manner that they do not present a substantially continuous outwardly-facing cutting edge about its perimeter.

Moreover, although the cutting tool disclosed herein includes two wedge assemblies (e.g., 108 and 110), in some implementations, the cutting tool may include only one wedge assembly (e.g., either 108 or 110, but not the other).

The drive mechanism can vary considerably from the implementations disclosed herein.

The actuating medium for the drive mechanism can be something other than hydraulic fluid. In some implementations, for example, the actuating medium can be compressed air or some other compressed fluid.

In some implementations, the upper piston and the lower piston may be housed in different cylinders, with the upper piston cylinder aligned with the lower piston cylinder and each cylinder fluidly isolated from the other with an appropriate sealing arrangement. In such instances, the shaft from the upper piston may extend out of the upper piston's cylinder and through the lower piston's cylinder, extending also through the lower piston and the lower piston shaft inside the lower piston cylinder.

The size and relative and absolute shape of the various components in the cutting tool can vary considerably. Similarly, various parts, such as the housing assembly, for example, may be formed using a different number of parts than disclosed herein. Additionally, the various components (e.g., parts of the housing assembly) can be coupled together in a variety of ways.

Moreover, the housing assembly can be configured in a variety of ways. For example, it may be much smaller relative to the other cutting tool components and not covering every component.

In general, the cutting tool can include a variety of sealing mechanisms to prevent the inflow of water or other fluids when the cutting tool is submerged. In some implementations, the portion(s) of the housing assembly that contains the wedges is not sealed. However, in those implementations, the portion(s) of the housing assembly that contains the wedges has one or more drainage holes to allow water (or other fluids) that may have migrated in while that portion of the cutting tool was immersed to drain. The arrangement and size of such hole(s) can vary.

In some implementations, the vessel head is in the middle of the cylinder and the top end of the cylinder has a screw on gland the same as the bottom so that the piston can be positioned therein. In such implementations, the upper gland can be substantially similar to (or identical to) the bottom gland except that it has no hole in it for a rod to go through.

Other implementations are within the scope of the claims.

What is claimed is:

1. A cutting tool comprising:
   a housing assembly;
   a first blade actuating wedge assembly inside the housing assembly and movable relative to the housing assembly along a longitudinal axis, the first blade actuating wedge assembly comprising a plurality of first tapered blade actuating wedges; and
   a first plurality of cutting blades, each cutting blade in the first plurality of cutting blades being supported in a substantially fixed position relative to the housing assembly along the longitudinal axis,
   wherein each cutting blade in the first plurality of cutting blades is coupled to a respective one of the first tapered blade actuating wedges,
   wherein movement of the first tapered blade actuating wedge assembly along the longitudinal axis causes each cutting blade in the first plurality of cutting blades to move perpendicular to the longitudinal axis,
   a second blade actuating wedge assembly inside the housing assembly and movable relative to the housing assembly along the longitudinal axis, the second blade actuating wedge assembly comprising a plurality of second tapered blade actuating wedges; and
   a second plurality of cutting blades, each cutting blade in the second plurality of cutting blades being supported in a substantially fixed position relative to the housing assembly along the longitudinal axis, wherein each cutting blade in the second plurality of cutting blades is coupled a respective one of the second tapered blade actuating wedges, wherein movement of the second tapered blade actuating wedge assembly along the longitudinal axis causes each cutting blade in the second plurality of cutting blades to move perpendicular to the longitudinal axis, wherein the first blade actuating wedges are tapered in a first direction substantially parallel to the longitudinal axis and the second blade actuating wedges are tapered in a second direction, opposite the first direction, substantially parallel to the longitudinal axis.

2. The cutting tool of claim 1 wherein the cutting blades in the first and second plurality of cutting blades are movable between a retracted position and an extended position relative to the housing assembly.

3. The cutting tool of claim 2 wherein the cutting blades in the first and second plurality of cutting blades are configured so as to collectively present a substantially continuous, outwardly-facing annular cutting edge.

4. The cutting tool of claim 3 wherein the substantially continuous, outwardly-facing cutting edge is adapted to cut through a pipe from an inside of the pipe in a radially outward direction as the cutting blades in the first and second plurality of cutting blades are moved from the retracted position to the extended position.

5. The cutting tool of claim 1 wherein the first and second blade actuating wedge assemblies are configured to move in opposite directions inside the housing assembly during operation of the cutting tool.

6. The cutting tool of claim 1 wherein the first and second blade actuating wedge assemblies are configured so that the first blade actuating wedges mesh with the second blade actuating wedges.

7. The cutting tool of claim 1 further comprising a hydraulic drive mechanism configured to move the first and second blade actuating wedges along the longitudinal axis.

8. The cutting tool of claim 7 wherein the hydraulic drive mechanism comprises:
a hydraulic cylinder;
a first double-acting hydraulic piston inside the hydraulic cylinder and coupled to the first blade actuating wedge assembly via a first piston shaft; and
a second double-acting hydraulic piston inside the hydraulic cylinder and coupled to the second blade actuating wedge assembly via a second piston shaft.

9. The cutting tool of claim 8 wherein the hydraulic cylinder has:
a first hydraulic fluid port near a first longitudinal end of the hydraulic cylinder;
a second hydraulic fluid port near a second longitudinal end of the hydraulic cylinder, opposite the first longitudinal end; and
a centrally-disposed hydraulic fluid port approximately centrally-disposed relative to the first and second longitudinal ends.

10. The cutting tool of claim 1 wherein the housing assembly comprises a cutting head that defines a plurality of radial paths through which the cutting blades in the first and second plurality of cutting blades can move.

11. The cutting tool of claim 1 further comprising:
an external support feature at a first longitudinal end of the cutting tool, by which the cutting tool can be physically supported.

12. A cutting tool comprising:
a housing assembly;
a first blade actuating wedge assembly inside the housing assembly and movable relative to the housing assembly along a longitudinal axis, the first blade actuating wedge assembly comprising a plurality of first tapered blade actuating wedges; and
a first plurality of cutting blades, each cutting blade in the first plurality of cutting blades being supported in a substantially fixed position relative to the housing assembly along the longitudinal axis,
wherein each cutting blade in the first plurality of cutting blades is coupled to a respective one of the first tapered blade actuating wedges,
wherein movement of the first tapered blade actuating wedge assembly along the longitudinal axis causes each cutting blade in the first plurality of cutting blades to move perpendicular to the longitudinal axis,
a second blade actuating wedge assembly inside the housing assembly and movable relative to the housing assembly along the longitudinal axis, the second blade actuating wedge assembly comprising a plurality of second tapered blade actuating wedges; and
a second plurality of cutting blades, each cutting blade in the second plurality of cutting blades being supported in a substantially fixed position relative to the housing assembly along the longitudinal axis,
a hydraulic drive mechanism configured to move the first and second blade actuating wedges along the longitudinal axis, the hydraulic drive mechanism comprising:
a hydraulic cylinder;
a first double-acting hydraulic piston inside the hydraulic cylinder and coupled to the first blade actuating wedge assembly via a first piston shaft; and
a second double-acting hydraulic piston inside the hydraulic cylinder and coupled to the second blade actuating wedge assembly via a second piston shaft,
wherein each cutting blade in the second plurality of cutting blades is coupled a respective one of the second tapered blade actuating wedges,
wherein movement of the second tapered blade actuating wedge assembly along the longitudinal axis causes each cutting blade in the second plurality of cutting blades to move perpendicular to the longitudinal axis,
wherein the first blade actuating wedges are tapered in a first direction substantially parallel to the longitudinal axis and the second blade actuating wedges are tapered in a second direction, opposite the first direction, substantially parallel to the longitudinal axis,
wherein the second piston shaft extends through the first piston and through the first piston shaft to couple to the second blade actuating wedge assembly.

13. A drive mechanism comprising:
a cylinder housing;
a first double-acting piston configured for reciprocal motion along an axis inside the cylinder housing;
a first piston shaft extended from the first piston in a first direction along the axis;
a second double-acting piston configured for reciprocal motion along the axis inside the cylinder;
a second piston shaft extended from the second piston in the first direction along the axis through the first double-acting piston and through the first piston shaft;
a first fluid port near a first longitudinal end of the cylinder housing;
a second fluid port near a second longitudinal end of the cylinder housing, opposite the first longitudinal end; and a centrally-disposed fluid port approximately centrally-disposed relative to the first and second longitudinal ends.

14. The drive mechanism of claim 13 wherein the first piston shaft extends through an end wall of the cylinder housing at a first end of the cylinder housing and wherein the second piston shaft extends through the end wall of the cylinder housing at the first end of the cylinder housing inside the first piston shaft.

15. The drive mechanism of claim 13 wherein:
the centrally-disposed fluid port is configured to facilitate fluid flow into and out of a central space inside the cylinder housing between the first piston and second piston,
the first fluid port is configured to facilitate fluid flow into and out of a first end space inside the cylinder housing at an opposite side of the first piston from the central space, and
the second fluid port is configured to facilitate fluid flow into and out of a second end space inside the cylinder housing at an opposite side of the second piston from the central space.

16. The drive mechanism of claim 13 configured for hydraulically-powered operations.

17. A drive mechanism comprising:
a cylinder housing;
a first double-acting piston configured for reciprocal motion along an axis inside the cylinder housing;
a first piston shaft extended from the first piston in a first direction along the axis;
a second double-acting piston configured for reciprocal motion along the axis inside the cylinder; and
a second piston shaft extended from the second piston in the first direction along the axis through the first double-acting piston and through the first piston shaft;
wherein the drive mechanism is configured to drive a cutting tool that comprises:
a housing assembly;
a first blade actuating wedge assembly inside the housing assembly and movable relative to the housing assembly along a longitudinal axis, the first blade actuating wedge assembly comprising a plurality of first tapered blade actuating wedges;
a first plurality of cutting blades, each cutting blade in the first plurality of cutting blades being supported in a substantially fixed position relative to the housing assembly along the longitudinal axis,
wherein each cutting blade in the first plurality of cutting blades is coupled a respective one of the first tapered blade actuating wedges,
wherein movement of the first tapered blade actuating wedge assembly along the longitudinal axis causes each cutting blade in the first plurality of cutting blades to move perpendicular to the longitudinal axis;
a second blade actuating wedge assembly inside the housing assembly and movable relative to the housing assembly along the longitudinal axis, the second blade actuating wedge assembly comprising a plurality of second tapered blade actuating wedges;
a second plurality of cutting blades, each cutting blade in the second plurality of cutting blades being supported in a substantially fixed position relative to the housing assembly along the longitudinal axis,
wherein each cutting blade in the second plurality of cutting blades is coupled a respective one of the second tapered blade actuating wedges,
wherein movement of the second tapered blade actuating wedge assembly along the longitudinal axis causes each cutting blade in the second plurality of cutting blades to move perpendicular to the longitudinal axis,
wherein the first piston is coupled to the first blade actuating wedge assembly the second piston is coupled to the second blade actuating wedge assembly.

18. A method comprising:
providing a cutting tool that comprises:
a housing assembly;
a first blade actuating wedge assembly inside the housing assembly and movable relative to the housing assembly along a longitudinal axis, the first blade actuating wedge assembly comprising a plurality of first tapered blade actuating wedges;
a first plurality of cutting blades, each cutting blade in the first plurality of cutting blades being supported in a substantially fixed position relative to the housing assembly along the longitudinal axis,
a second blade actuating wedge assembly inside the housing assembly and movable relative to the housing assembly along the longitudinal axis, the second blade actuating wedge assembly comprising a plurality of second tapered blade actuating wedges; and
a second plurality of cutting blades, each cutting blade in the second plurality of cutting blades being supported in a substantially fixed position relative to the housing assembly along the longitudinal axis,
wherein each cutting blade in the first and second plurality of cutting blades is coupled a respective one of the tapered blade actuating wedges,
wherein the first tapered blade actuating wedges are tapered in a first direction substantially parallel to the longitudinal axis and the second tapered blade actuating wedges are tapered in a second direction, opposite the first direction, substantially parallel to the longitudinal axis,
wherein movement of the first and second tapered blade actuating wedge assemblies along the longitudinal axis causes each cutting blade to move perpendicular to the longitudinal axis;
positioning the cutting tool inside a pipe; and
causing the first and second tapered blade actuating wedge assemblies to move in opposite directions along the longitudinal axis to cause each cutting blade to move between a retracted position and an extended position relative to the housing assembly.

19. The method of claim 18 further comprising:
cutting through the pipe with the cutting blades, collectively.

20. A cutting tool comprising:
a housing assembly;
a first blade actuating wedge assembly inside the housing assembly and movable relative to the housing assembly along a longitudinal axis, the first blade actuating wedge assembly comprising a plurality of first tapered blade actuating wedges; and
a first plurality of cutting blades, each cutting blade in the first plurality of cutting blades being supported in a substantially fixed position relative to the housing assembly along the longitudinal axis,
wherein each cutting blade in the first plurality of cutting blades is coupled to a respective one of the first tapered blade actuating wedges,
wherein each cutting blade in the first plurality of cutting blades includes an outwardly-facing cutting edge, wherein movement of the first tapered blade actuating wedge assembly along the longitudinal axis causes each cutting blade in the first plurality of cutting blades to move perpendicular to the longitudinal axis and the outwardly-facing cutting edge of each cutting blade in the first plurality of cutting blade to contact and cut through an object.

21. The cutting tool of claim 20, wherein movement of the first tapered blade actuating wedge assembly along the longitudinal axis causes each cutting blade in the first plurality of cutting blades to move perpendicular to the longitudinal axis and the outwardly-facing cutting edge of each cutting blade in the first plurality of cutting blade to contact and cut through an object without rotation of the cutting blades about the longitudinal axis.

* * * * *